United States Patent [19]

Gibot

[11] Patent Number: 4,640,099
[45] Date of Patent: Feb. 3, 1987

[54] PROCESS AND INSTALLATION FOR COOLING A VISCOUS AND IN PARTICULAR FOOD PRODUCT

[75] Inventor: Claude Gibot, Malakoff, France

[73] Assignee: L'Air Liquide, Societe Anonyme pour l'Etude et l'Exploitation des Procedes Georges Claude, Paris, France

[21] Appl. No.: 800,637
[22] PCT Filed: Mar. 5, 1985
[86] PCT No.: PCT/FR85/00040
 § 371 Date: Oct. 29, 1985
 § 102(e) Date: Oct. 29, 1985
[87] PCT Pub. No.: WO85/03999
 PCT Pub. Date: Sep. 12, 1985

[30] Foreign Application Priority Data
 Mar. 5, 1984 [FR] France ............................ 84 03375

[51] Int. Cl.⁴ ............................................ F25D 25/00
[52] U.S. Cl. ........................................... 62/62; 62/68; 62/381; 62/384; 62/514 R
[58] Field of Search ................. 62/62, 68, 76, 330, 62/384, 381, 514 R

[56] References Cited

U.S. PATENT DOCUMENTS 3,224,213 12/1965 Hoyt, Jr. .................................. 62/68
3,871,107 3/1975 Broadwin ............................. 62/384

FOREIGN PATENT DOCUMENTS 385377 12/1931 Belgium .
395194 3/1935 Belgium .
451307 7/1943 Belgium .
844748 5/1952 Fed. Rep. of Germany .
2916310 10/1980 Fed. Rep. of Germany .
934223 5/1948 France .
2194924 3/1974 France .
2446606 8/1980 France .

Primary Examiner—Ronald C. Capossela
Attorney, Agent, or Firm—Young & Thompson

[57] ABSTRACT

The invention concerns the cooling of a viscous product. The product placed in a vessel 30 is cooled by a rotary pot 8 in which is generated, by sleeves 20 and 21, a deposit of carbonic acid snow 40. Application in the cooling of food products such as clear soups, thick soups, sauces, creams, pastes, gelled products, etc.

16 Claims, 1 Drawing Figure

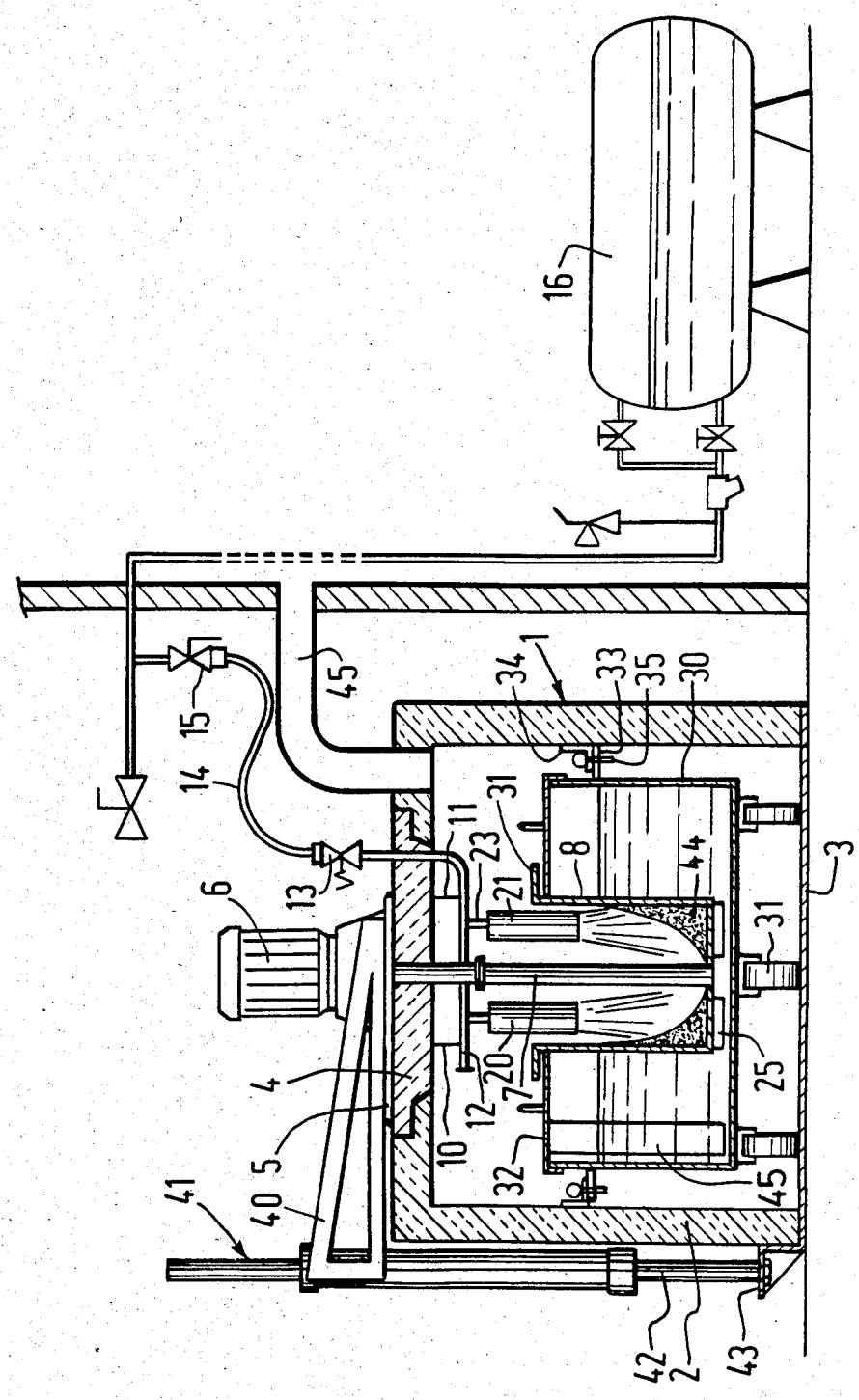

PROCESS AND INSTALLATION FOR COOLING A VISCOUS AND IN PARTICULAR FOOD PRODUCT

The present invention relates to the cooling of a viscous and in particular food product of the type employing a thermal exchange between a cryogenic medium and a mass of said product.

In the food industry and in the collective restaurant service, the rapid cooling of certain food products is an absolute necessity. At the present time, in practice the cooling is achieved by a simple stay in the cold room for a period on the order of 24 to 48 hours, which is a serious inconvenience.

An object of the invention is to achieve a cooling of a viscous and in particular food product which permits the treatment of large charges or amounts, for example of 30 to 100 liters, with relatively short treating periods, on the order of a maximum of two hours, for the purpose of reducing the temperature to +10° C. while permitting subsequent cleaning operations carried out in a simple and rapid manner.

It has been proposed to ensure a rapid cooling by means of a thermal-exchange coiled tube supplied with a refrigerating fluid and immersed in the mass of product, but it has been found that this manner of proceeding was unsuitable for products having a high viscosity, since a crust or caking was immediately formed in the region of the coiled tube which interferes with the thermal transfer and may result in a deterioration of the product.

Moreover, the cleaning of such a coiled tube is hardly practical.

For example, it is known from French Pat. No. 934,223 to produce by means of a sorbet machine frozen products in the solid form. In this type of sorbet machine, there is used a vessel in which ice is disposed and this vessel is immersed in the product to be frozen while the vessel provided with fins is rotated so as to improve the thermal exchange between the ice and the product which gradually solidifies. In such a process, the purpose is to rapidly solidify the product. Consequently it is advantageous to apply the largest possible amount of negative calories to the product to be frozen within the shortest period of time.

Similar processes and devices are disclosed for example in the Belgian Pat. No. 385,377 and the French Pat. No. 2,194,924. In these patents, carbon dioxide is used in the liquid state as the refrigerating product, the sublimation of the carbonic acid snow occurring at a temperature which is sufficiently low relative to the temperature for freezing the product to ensure that this operation is carried out in a relatively rapid manner.

The problem posed by the invention differs from the problem of the freezing of a food product. In the industry for preparing food products intended to be subsequently wrapped for their preservation, there has been a particular development recently of the pre-cooked dishes or like type of product. These products usually include sauces, for example homogeneous sauces of the Béchamel type, the homogeneity of which must not be destroyed in the course of the preservation process, or products in the form of a sauce of "coquille Saint-Jacques," or "bouchee a la reine" type, etc., in which the difficulty results from the fact that it is essential to avoid a deterioration of the sometimes fragile pieces present in this sauce.

In order to conform to food health requirements, the manufacturer of the sauce or like products usually has about 1 hour 30 minutes for cooling his product from the cooking temperature, on the order of 90° C., to its preservation temperature of about 10° C., it being necessary to maintain this temperature until the wrapping or packaging of the product and to ensure that the two operations do not exceed two hours.

The problem is therefore to cool large quantities of products of the sauce type (for example quantities on the order of 100 liters) rapidly while avoiding the creation of a solid crust or caking in this sauce which would result in an excessive cooling and therefore in a partial freezing of this sauce.

The various methods described above do not provide at the present time a solution to this problem.

According to the cooling process of the invention, in a process for cooling a viscous and in particular food product, of the type employing a thermal exchange between a cryogenic medium and a mass of said product, the thermal exchange is achieved through a metal wall in the form of a pot immersed in the mass of the product and in which is produced a deposit of carbonic acid snow constituting the said crogenic medium, while the mass of product is maintained in a stirred state.

In this way, and by effecting successive stages of generation of carbonic acid snow followed by stages in which said generation of carbonic acid snow is stopped, while the mass of product is permanently stirred, it is quite possible to achieve a considerable thermal transfer without the crust-forming phenomenon occurring while the final cleaning of such thermal transfer means is particularly easy to carry out.

For this purpose, it has been found that the avoidance of a crust in the region of the wall of the thermal exchange between the carbonic acid snow and the product to be cooled was only possible if the cooling of the latter was carried out in successive temperature lowering steps. In order to achieve this, it is necessary to alternate the successive stages for cooling the walls of the immersed pot (injection of carbonic acid snow) and the stages corresponding to the rise in temperature of these walls, in the course of which the walls resume the temperature of the product to be cooled after a complete sublimation of the carbonic acid snow, the product being constantly maintained in the stirred state compatible with the composition.

The invention also provides an installation for cooling a viscous and in particular food product, comprising in a thermally insulated container, means for receiving a vessel for the treated product, means for placing in position and raising a thermal exchange pot relative to said vessel, said pot being associated with at least one carbonic acid snow producer.

It will be observed that the invention, which combines both a thermal transfer medium in the form of carbonic acid snow at a temperature on the order of −79° C. with a thermal exchange element in the form of a cylindrical pot, permits the transfer of a large refrigerating flux owing to the permanent stirring of the product to be treated which ensures a homogenization of the temperature within the mass of the product.

Further, the cold gasses resulting from the sublimation of the carbonic acid snow facilitate the lowering of the temperature by thermal exchange with the exterior of the treating vessel before being discharged to the exterior through a flue.

The speed of rotation of the pot in the product to be cooled of course depends on the viscosity of the product. If the latter is of low viscocity (for example a soup, tomato sauce, etc.) the speed of rotation may be increased without risk of adversely affecting the quality of the product. It will be understood that the cooling of the product is more rapid as the speed of rotation is increased.

On the other hand, in respect of a rather high viscosity of the product (for example Béchamel sauce or a sauce of the "boucheé à la reine" type) the speed of rotation of the immersed pot must be moderate in order to avoid an impairment of the qualities of the product (separation of the ingredients of the Béchamel sauce or rupture of the pieces in the sauce of the "boucheé à la reine" type).

In order to obtain a cooling under good conditions, it has been found that the speed of rotation of the pot in the product must be such that, bearing in mind the mass of carbonic acid snow in the pot, this mass rises along the walls of the pot preferably up to the level of the product to be cooled in its vessel. When viewed in section, the surface of the carbonic acid snow is substantially parabolic. In this way the area of thermal exchange between the carbonic acid snow and the product to be cooled is increased to the maximum, bearing in mind that upon the sublimation of the carbonic acid snow, it cools the product in its outer peripheral part before being discharged.

In order to improve the homogeneous cooling of the product, the immersed pot has on its lower wall blades in the shape of vanes whereby it is possible, when rotating the pot, to urge the product to be cooled toward the exterior of the treating vessel and thus produce a rising current in the product to be cooled. In order to still further improve the cooling, it is preferred to provide on the walls of the vessel containing the product to be cooled "anti-vortex" blades whose function is to break the vortex of the product which is formed in the cooling vessel and to return in this way the product from the exterior of the vessel toward the interior of the latter in contact with the immersed pot. Preferably, there will be disposed in a frustoconical or cylindrical vessel, three orientable anti-vortex blades spaced 120° apart.

In a preferred embodiment, these blades will be orientable so as to permit a variation in the vortex-breaking efficiency. Indeed, in the case of products which are not very fragile, namely of the tmato sauce or soup type, etc., it has been found that these blades may be oriented substantially radially, which results in a more intense circulation of the product and consequently a more rapid cooling of the latter.

On the other hand, in the case of fragile products of the Béchamel sauce type or a sauce including pieces, the orientation of the blades in a radial direction results in a partial or total destruction of these pieces. Under these conditions, it is usually found that an orientation of the blades at about 45° relative to the radial position in the direction of rotation of the product in its vessel, gives good results and enables the cooling to be accelerated without substantially altering the quality of the product.

It has also been found that the amount of negative calories for cooling the product without the formation of a crust must be determined in such manner as to lower the temperature in successive steps. In practice, it is found that if the carbonic acid snow is injected into the pot during a period T, excellent results are obtained from the point of view of rapidity of cooling in the absence of a crust, by ceasing this injection during a period on the order of 2 to 3 T.

Generally, it is known that for a given period of contact of a given quantity of carbonic acid snow with the product to be cooled, the extent to which the product drops in temperature is all the less as its temperature is low.

Under these conditions, a person skilled in the art will experiment in order to determine the relative periods required for avoiding the crusting of the product when this product is around the final cooling temperature in order to determine the successive stages of the injection of carbonic acid snow and the stoppage of this injection. In order to simplify the apparatus for carrying out the process, he will then determine the constant periods of the successive stages from these conditions at the end of the treatment. This will slightly increase the time required for the process, since it would have been possible to cool the product much more rapidly at the start without formation of a crust, but on the other hand, this considerably simplifies the procedure.

Of course, it is quite possible by simple routine experiments to determine for a precise product the relative duration of the stages of injection and non-injection of carbonic acid gas within the range indicated above as a function of the duration of the treatment or of the temperature of the product in the course of cooling and to vary these durations by means of a programmed electronic control in the known manner.

For any product, it is found in practice that a quantity on the order of 0.7 to 0.8 kg of liquid $CO_2$ per kg of viscous product to be cooled in required for the whole of the duration of the cooling treatment.

Features and advantages of the invention will be apparent from the following description with reference to the accompanying drawing which represents a vertical sectional view of an installation according to the invention.

With reference to the accompanying drawing, a cooling installation according to the invention comprises a thermally insulated container 1 with a cylindrical vertical wall 2, a metal bottom 3 and a detachable cover 4. The cover 4 is mounted on a support plate 5 on which is mounted a motor-speed reducer unit 6 whose output shaft 7 extends to the bottom of a stainless steel thermal exchanger pot 8 to which it is fixed. The cover 4 supports by struts 10 and 11 a liquid carbon dioxide supply pipe 12 connected by an electrically-operated valve 13 to a flexible supply pipe 14 which is itself connected by a stop valve 15 to a source of liquid carbon dioxide 16 maintained at $-20°$ C. under a pressure of 20 bars. The carbon dioxide pipe 12 supplies carbon dioxide to two generators of carbonic acid snow 20 and 21 in the form of cylindrical sleeves each provided in the known manenr with a pressure-reducing nozzle with which communicate liquid carbon dioxide branch pipes 23. The thermal exchange pot is also provided with radial stirring blades 25 on its lower wall.

The thermal exchange pot 8 extends substantially to the bottom of the cylindrical treating vessel 30 supported by three wheels 31 and having a cover 32 defining an axial opening to allow the passage with a slight clearance of the thermal exchange pot 8 which has an upper sealing flange 31. The treatng vessel 30 as lateral handles 33 adapted to come into alignment with fixing lugs 34 secured to the container 2, these handles being connected to the lugs by means of a pin 35.

The movable unit comprising the cover 4, the motor 6, the shaft 7, the distributing pipe 12, the two carbonic acid snow generators 20 and 21, and the thermal exchange pot 8, is mounted on an arm 40 of a derrick 41 whose column constitutes the moving part of a jack 42 whose head is fixed to a support bracket 43 of the bottom 3 of the container.

The installation operates in the following manner:

Initially, the jack 42 is in the extended position so as to raise the movable unit consisting of the motor 6, the pot 8, and the generators 20, and allow free access to the interior of the container for admitting, through a side door (not shown), the treating vessel 30 mounted on the wheels 31. When this treating vessel has been brought into position in which it is locked by the handles 33 and the pins 34, the movable unit described above is lowered, and this lowers the pot 8 until it almost reaches the bottom of the treating vessel 8 simultaneously with the positioning of the cover 4 in its closing position. Thereafter, with the stop valve 15 open, the electrically-operated valve 13 is in succession opened for a short period of time and then closed for a longer period of time.

The expansion of the carbon dioxide, at a pressure of 20 bars and at $-20°$ issuing from the sleeves 20 and 21, generates a flow of carbonic acid snow which applies itself against the bottom and the side wall of the pot 8 and thus forms a deposit as shown at 44. This deposit 44 is sublimated during the stage in which the supply of liquid carbon dioxide is stopped and transfers its negative calories mainly through the wall of the pot 8 and partly through the carbon dioxide vapors escaping into the container 1 around the vessel 30 which they cool before escaping through the flue 45. The temperature of the product thus progressively drops, the wall of the pot 8 rising in temperature, at each end of the sublimation of the deposit of carbonic acid snow, to the temperature of the product being cooled.

By way of example, sauces were treated under the following conditions:

EXAMPLE 1

Béchamel sauce: 80 liters
Béchamel composition by weight: 6.43% margarine: 6.43% flour: 12.05% grated cheese
Remainder: milk
Temperature before treatment: +66° C. Temperature after treatment: +8° C.
Duration of the treatment: 1 hr 15 min
Consumption of $CO_2$: 0.8 kg per kg of sauce
Speed of rotation: 200 rpm
Time required for cleaning after treatment to obtain equipment ready for further use: 8 to 10 min

EXAMPLE 2

Tomato sauce

There is effected a cooling from 90° C. to 10° C. within 30 minutes with a speed of rotation of 200 rpm and stages of injection of carbonic acid snow of 30 seconds followed by pause stages (in which there is no injection of carbon dioxide) of 1 minute 30 seconds, all other factors being the same as those in the preceeding example,

EXAMPLE 3

Pizza sauce

Mushroom sauce a la grecque

Cocquilles Saint-Jacques sauce

As concerns these three sauces which contain relatively fragile pieces, it is found that the application of the same conditions of treatment as for the foregoing Béchamel sauce, the cooling is achieved substantially within the same time without adversely affecting the solid products. Of course, the anti-vortex blades were in these examples as in the case of the Béchamel sauce oriented at 45° (orientation at 90° in the case of the tomato sauce).

The envisaged fields of application are the cooling of clear soups, thick soups, sauces, creams, pastes, garnishing products of the gelled type, etc., in particular in the collective restaurant services and in the industrial food production.

I claim:

1. A process for cooling a viscous product, and in particular a food product to a temperature above 0° C., said process comprising effecting a thermal exchange between a cryogenic medium and a mass of said product through a metal wall of a pot immersed in the mass of product, by generating carbonic acid snow constituting said cryogenic medium in said pot while continuously maintaining the mass of product in a stirred state, and regulating said snow generation so as continuously to maintain in a viscous state the product which is in contact with said pot.

2. A process according to claim 1, comprising rotating said pot so as to cause said stirred state of the mass of product, and causing a rising current in said mass around the pot.

3. A process according to claim 2, comprising effecting successive stages of generation of carbonic acid snow followed by stopping stages in which said generation of carbonic acid snow is stopped.

4. A process according to claim 3, comprising stopping the generation of carbonic acid snow in said stopping stages until a complete sublimation of the carbonic acid snow is achieved.

5. A process according to claim 3, wherein said stopping stages are about two to three times longer than said snow generation stages.

6. An installation for cooling a viscous product, and in particular a food product, to a temperature above 0° C., said installation comprising a vessel for receiving a mass of the product to be treated, a thermal exchange pot having a metal wall, means for placing said pot in position in said vessel and thereby immersing said pot in said mass of product, means for generating carbonic acid snow in said pot, means for continuously stirring said mass of product, and means for regulating said snow generating means so as continuously to maintain in a viscous state the product which is in contact with said pot.

7. An installation according to claim 6, further comprising a thermally insulated container in which said vessel is disposed, and means for raising said pot out of said vessel.

8. An installation according to claim 7, comprising means for allowing said vessel to be received in said container and to be withdrawn from said container.

9. An installation according to claim 7, comprising a motor disposed outside said container and a rotary shaft drivingly connected to the motor and extending into said container and having an end on which said pot is mounted.

10. An installation according to claim 9, comprising stirring blades on a bottom of said pot adapted for stirring said product and urging said product toward an exterior part of said vessel.

11. An installation according to claim 9, comprising a unit including said shaft and said pot, a derrick arm supporting said unit, a column on which said arm is mounted and a jack combined with said column for selectively raising and lowering said arm.

12. An installation according to claim 6, comprising an annular cover covering said vessel and surrounding said pot, and anti-vortex vertical blades mounted on said cover and extending into said vessel.

13. An installation according to claim 12, wherein said blades are orientable.

14. An installation according to claim 6, comprising stationary anti-vortex blades in the vessel around said pot.

15. An installation according to claim 14, wherein said blades are orientable.

16. An installation for cooling a viscous product, and in particular a food product to a temperature above 0° C., said installation comprising means for effecting a thermal exchange between a cryogenic medium and a mass of said product through a metal wall of a pot immersed in the mass of product by generating carbonic acid snow constituting said cryogenic medium in said pot while continuously maintaining the mass of product in a stirred state, and means regulating said snow generation so as continuously to maintain in a viscous state the product which is in contact with said pot.

* * * * *